April 25, 1961  H. E. McKELVEY ET AL  2,981,563
SUPPORTING GLASS SHEETS
Filed Jan. 14, 1959

INVENTORS
HAROLD E. McKELVEY and
RUDOLPH L. MALOBICKY
BY
Oscar L. Spencer
ATTORNEY United States Patent Office 2,981,563
Patented Apr. 25, 1961

2,981,563
SUPPORTING GLASS SHEETS
Harold E. McKelvey, Cheswick, and Rudolph L. Malobicky, Tarentum, Pa., assignors to Pittsburgh Plate Glass Company, Allegheny County, Pa., a corporation of Pennsylvania
Filed Jan. 14, 1959, Ser. No. 786,720
3 Claims. (Cl. 294—119)

The present invention relates to supporting glass sheets, and specifically refers to tongs for gripping glass sheets during thermal treatment. Tongs have been used for supporting glass sheets vertically for thermal treatment by gripping the glass sheet between its opposite surfaces. The tongs are supported by a clevis attached to a carriage which rides an overhead monorail extending through thermal treatment apparatus.

Since glass sheets are heated to substantially the softening point during thermal treatment required for tempering or certain coating procedures, it is important that the glass sheets be gripped securely by the tongs when they are initially loaded. This requires inserting a glass sheet between the tong points at the proper angle of entry. If the glass sheet is not disposed in a vertical plane during its entry between the tong points, the efficiency of the tongs to grip the glass sheet is impaired. Also, if the glass sheet is large enough to require gripping by two or more tongs, an incorrect angle of entry causes the tongs to twist relative to their respective supports. This twisting may result in establishing stresses where the tongs grip the glass sheet.

The present invention insures proper entry of the glass sheet to be loaded into tongs by providing the tongs with a guiding member located below the bottom portion of each tong arm and comprising an obliquely upwardly extending portion. Thus, the guiding members define a narrowing upwardly extending space between which a glass sheet is inserted for gripping by the tong points. The guiding members are so constructed and arranged that they define a minimum space therebetween that is slightly greater than the distance between the tong points.

Figure 1:
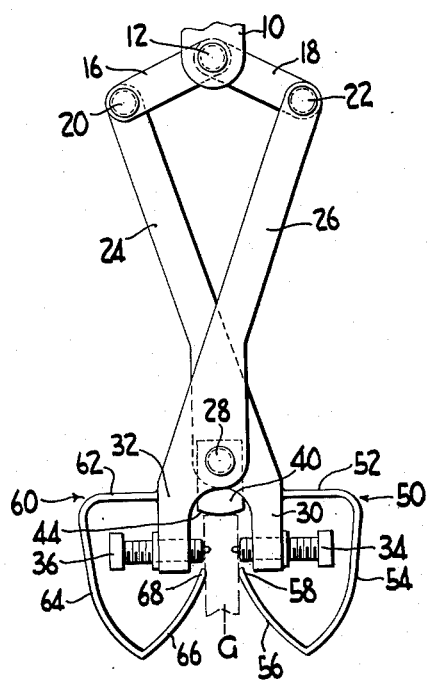
Figure 2:
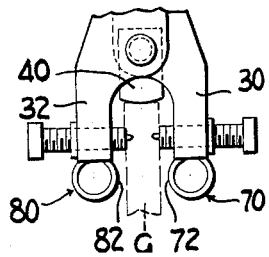

A typical embodiment illustrating the present invention will now be described to facilitate its understanding. In the drawings which form part of the description of the illustrative embodiment, a typical illustrative embodiment is shown in elevation in Figure 1 and a fragmentary elevational view of an alternate embodiment is seen in Figure 2.

The tongs comprise a tong support means including a clevis 10 (shown only in part) carried by a carriage (not shown) supported on a monorail (not shown) which extends through a heating furnace and either a quenching station or a coating station. Since the heating furnace, the quenching station or coating station and the means for conveying the tongs through the furnace are not part of the present invention, they will not be described in detail.

The clevis 10 provides support for a tong support pin 12 extending therethrough and secured in place by means of a cotter pin (not shown). Upper links 16 and 18 are pivoted to tong support pin 12 at their upper ends and at their bottom ends carry one of a pair of link pins 20 and 22 which pivotally secure the upper links 16 and 18 to tong arms 24 and 26 respectively. A common hinge pin 28 pivotally secures tong arms 24 and 26 to each other. The tong support pin 12, the link pins 20 and 22 and the common hinge pin 28 provide substantially parallel horizontal axes about which the upper links 16 and 18 and the tong arms 24 and 26 pivot relative to each other.

Tong arm 24 terminates in an apertured bottom portion 30, while tong arm 26 terminates in an apertured bottom portion 32. The respective bottom portions are apertured along axes normal to link pins 20 and 22 and common hinge pin 28 to receive pointed screws 34 and 36 respectively. The opposed points of the pointed screws 34 and 36 form the tong points between which a glass sheet is gripped. The tong arms and links are so constructed that the tong points 34 and 36 are urged to move toward each other to grip a sheet of glass G (shown in phantom) therebetween.

A stop member 40 is pivotally mounted to the common hinge pin 28 and is provided with a bottom edge surface 44 of convex construction so as to make tangential contact with the upper edge of glass sheet G.

In order to insure that the glass sheet G is aligned properly while it is inserted for gripping engagement between the tong points 34 and 36, resilient guiding members 50 and 60 are attached, for example, by welding, to the bottom portions 30 and 32, respectively. Each guiding member comprises an outwardly extending portion 52, 62 secured at its inboard extremity to the outer surface of bottom portion 30 and 32, respectively. Horizontal portions 52 and 62 are turned to form downwardly extending portions 54 and 64, respectively. These latter in turn are bent to form upward extensions 56 and 66 terminating at tips 58 and 68, respectively.

The guiding members are composed of a high temperature resistant alloy such as stainless steel containing 18% chromium, 8% nickel and less than 1% impurities with the balance iron. Other metals and alloys that have a long life and do not mar the glass by contact at elevated temperatures are also suitable.

The guiding members 50 and 60 are so constructed and arranged that their obliquely upwardly extending portions 56 and 66 define a narrowing upwardly extending space between which a glass sheet G is inserted for gripping by the tong points. The minimum space between the tips 58 and 68 is slightly greater than the distance between the tong points.

Another embodiment of guiding member is shown in Figure 2, wherein arcuate members 70 and 80 are welded to the bottom surfaces of bottom portions 30 and 32, respectively, so that their opposing curved surfaces 72 and 82 approach each other obliquely upwardly so that their minimum separation is slightly greater than that between the tong points as in the previous embodiment.

Particular embodiments of the present invention have been described for purposes of illustration rather than limitation. Obvious modifications may be made in the light of the present disclosure. Such modifications are intended to be included within the orbit of the present invention which is defined by the accompanying claims.

What is claimed is:

1. In tongs for supporting a glass sheet comprising tong support means, a pair of link pins, a pair of upper links including an upper link pivotally connected between the tong support and each of said link pins, a common hinge pin, a pair of tong arms including a tong arm pivotally connected between each of said link pins and said common hinge pin, each tong arm having a portion extending below said common hinge pin, a tong point member carried by each said portion and extending toward the other tong point member to provide a pair of opposed tong points, the links and lever arms being so constructed and arranged to pivot relative to each other to grip a sheet of glass therebetween, the improvement comprising a resilient guiding member attached to each tong arm for movement therewith, each guiding member being located below one of each said tong points and comprising an obliquely upwardly extending portion, said resilient guiding members defining a narrowing upwardly extending space between which a glass sheet is inserted for gripping by said tong points.

2. Apparatus as in claim 1, wherein the guiding members are so constructed and arranged that they define a minimum space therebetween that is slightly greater than the distance between the tong points.

3. Apparatus as in claim 1, wherein each guiding member comprises a horizontal portion attached at one end to a tong arm bottom portion and extending outwardly therefrom, a portion extending downwardly and an obliquely upwardly extending portion.

References Cited in the file of this patent

UNITED STATES PATENTS

| | | |
|---|---|---|
| 1,494,880 | Ausbrooks | May 20, 1924 |
| 2,194,730 | Wilson | Mar. 26, 1940 |
| 2,213,014 | Owen | Aug. 27, 1940 |
| 2,247,098 | Pearse | June 24, 1941 |
| 2,263,005 | McClure | Nov. 18, 1941 |
| 2,289,829 | Dixon | July 14, 1942 |
| 2,476,169 | White et al. | July 12, 1949 |
| 2,710,493 | Glynn | June 24, 1955 |